(12) United States Patent
Shirley

(10) Patent No.: US 11,392,013 B2
(45) Date of Patent: Jul. 19, 2022

(54) IMAGE REAR-PROJECTION AND IMAGE CAPTURE

(71) Applicant: HEWLETT-PACKARD DEVELOPMENT COMPANY, L.P., Spring, TX (US)

(72) Inventor: Nathan Shirley, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 16/604,158

(22) PCT Filed: Apr. 19, 2018

(86) PCT No.: PCT/US2018/028335
§ 371 (c)(1),
(2) Date: Oct. 9, 2019

(87) PCT Pub. No.: WO2019/203833
PCT Pub. Date: Oct. 24, 2019

(65) Prior Publication Data
US 2021/0364890 A1 Nov. 25, 2021

(51) Int. Cl.
| G03B 21/14 | (2006.01) |
| G03B 17/53 | (2021.01) |
| G03B 21/60 | (2014.01) |
| G03B 17/54 | (2021.01) |
| G02B 5/30 | (2006.01) |
| G03B 21/28 | (2006.01) |
| G03B 21/20 | (2006.01) |

(52) U.S. Cl.
CPC ............. *G03B 17/54* (2013.01); *G02B 5/30* (2013.01); *G03B 21/28* (2013.01); *G03B 21/60* (2013.01); *G03B 21/2033* (2013.01)

(58) Field of Classification Search
CPC ........ G03B 21/14; G03B 21/50; G03B 21/28; G03B 21/122; G03B 17/54; G02B 5/30
USPC .............. 353/20; 348/14.01, 14.07, 13.9
See application file for complete search history.

(56) References Cited

U.S. PATENT DOCUMENTS

| 5,400,069 A * | 3/1995 | Braun .............. H04N 7/144 348/14.08 |
| 7,192,147 B2 | 3/2007 | Sakata et al. |
| 8,355,038 B2 * | 1/2013 | Robinson ........... H04N 5/222 348/14.01 |

(Continued)

FOREIGN PATENT DOCUMENTS

| CN | 101813993 | 8/2010 |
| CN | 101950221 | 1/2011 |

(Continued)

OTHER PUBLICATIONS

Sphere: Multi-Touch Interactions on a Spherical Display.

*Primary Examiner* — William C. Dowling
(74) *Attorney, Agent, or Firm* — Michael A Dryja

(57) ABSTRACT

A projector and a camera are each disposed behind a transparent projection surface. The projector is to rear-project a first image onto the transparent projection surface, whereas the camera is to capture a second image in front of the transparent projection surface. Capture by the camera of the first image as reflected back by the transparent projection surface after rearprojection by the projector, as part of the second image, is minimized.

14 Claims, 7 Drawing Sheets

(56) References Cited

U.S. PATENT DOCUMENTS

| | | | |
|---|---|---|---|
| 8,988,489 B2* | 3/2015 | Apostolopoulos | H04N 7/147 348/14.12 |
| 9,016,872 B2 | 4/2015 | Aruga | |
| 2008/0043100 A1* | 2/2008 | Sobel | H04N 9/3194 348/139 |
| 2008/0051135 A1* | 2/2008 | Destain | H04N 9/3176 455/556.1 |
| 2011/0241986 A1* | 10/2011 | Feng | G06F 3/0386 345/158 |
| 2014/0104481 A1* | 4/2014 | Spears | G06F 3/017 348/342 |
| 2015/0062292 A1 | 3/2015 | Kweon | |

FOREIGN PATENT DOCUMENTS

| | | |
|---|---|---|
| CN | 102566743 | 7/2012 |
| RU | 2349946 C1 | 3/2009 |

\* cited by examiner

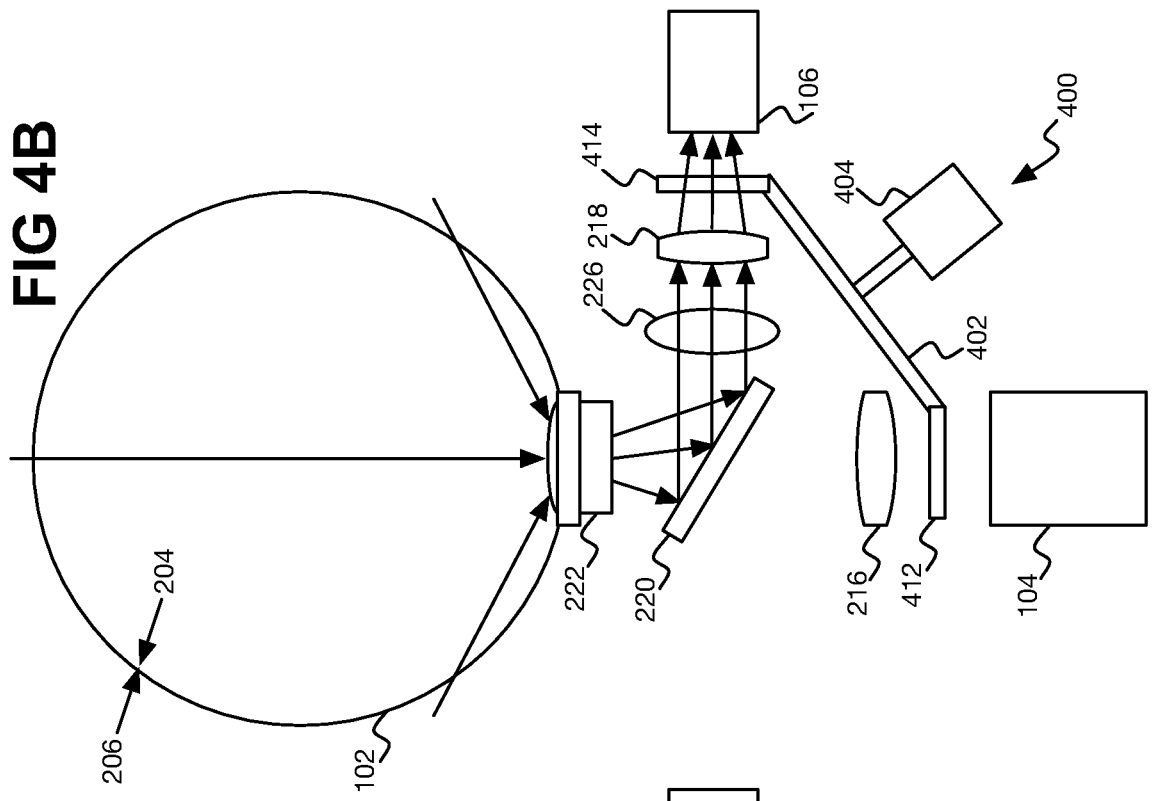
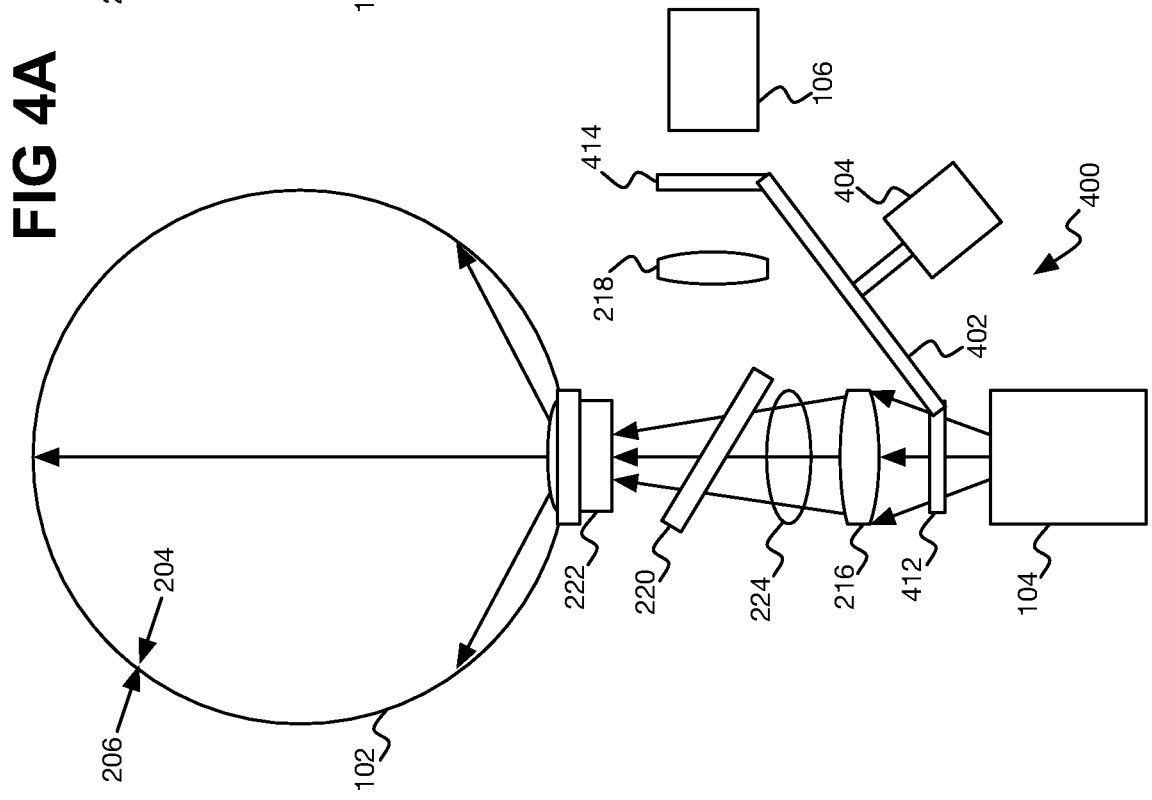

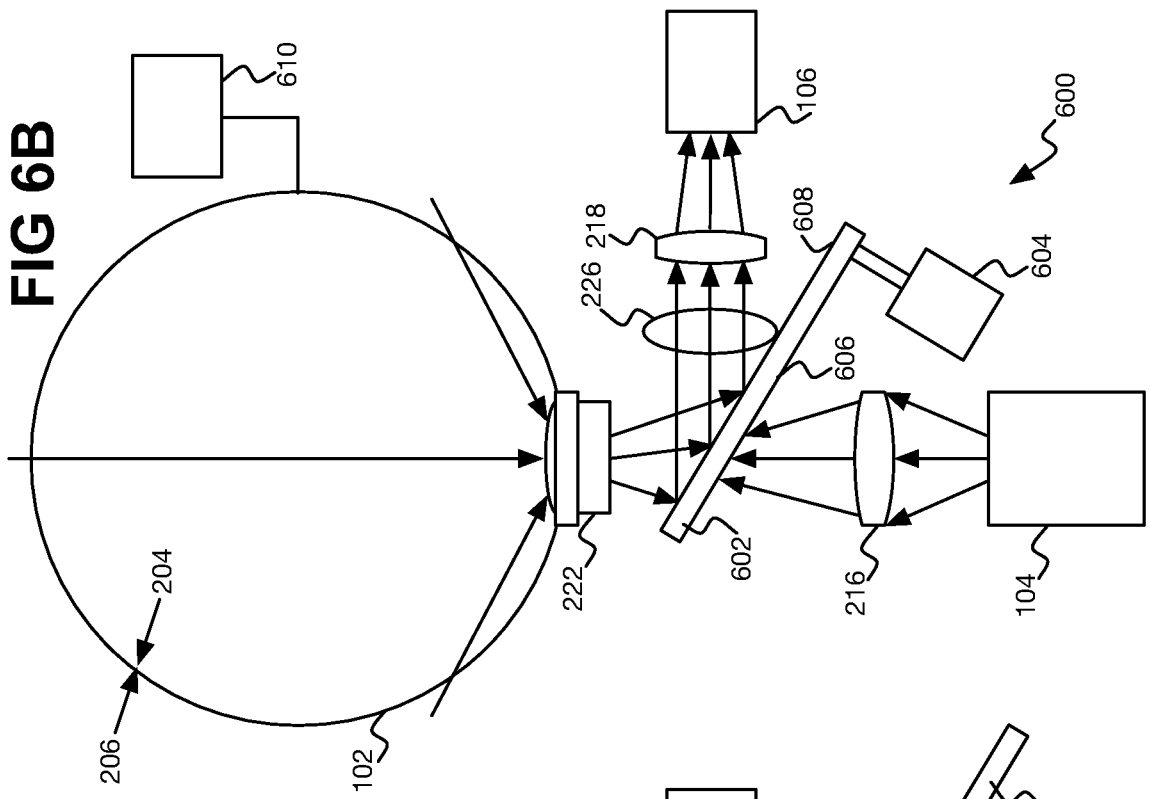
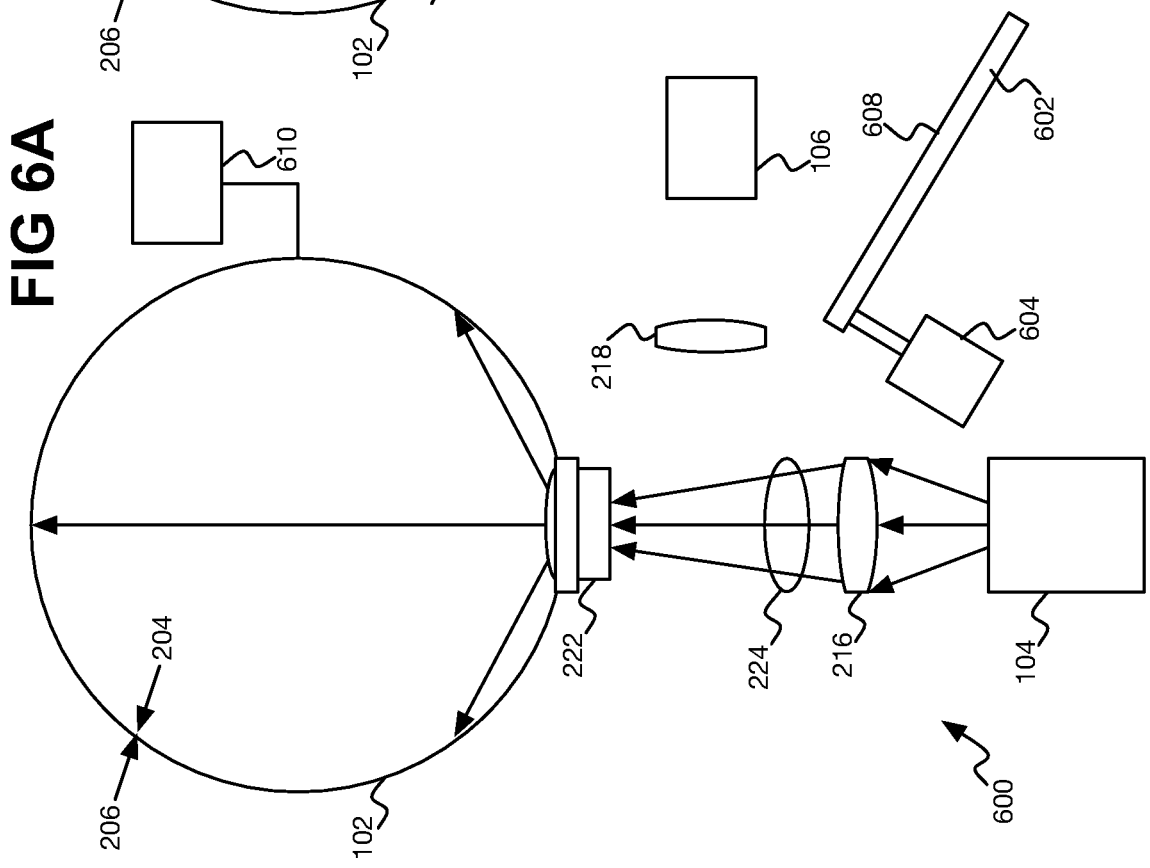

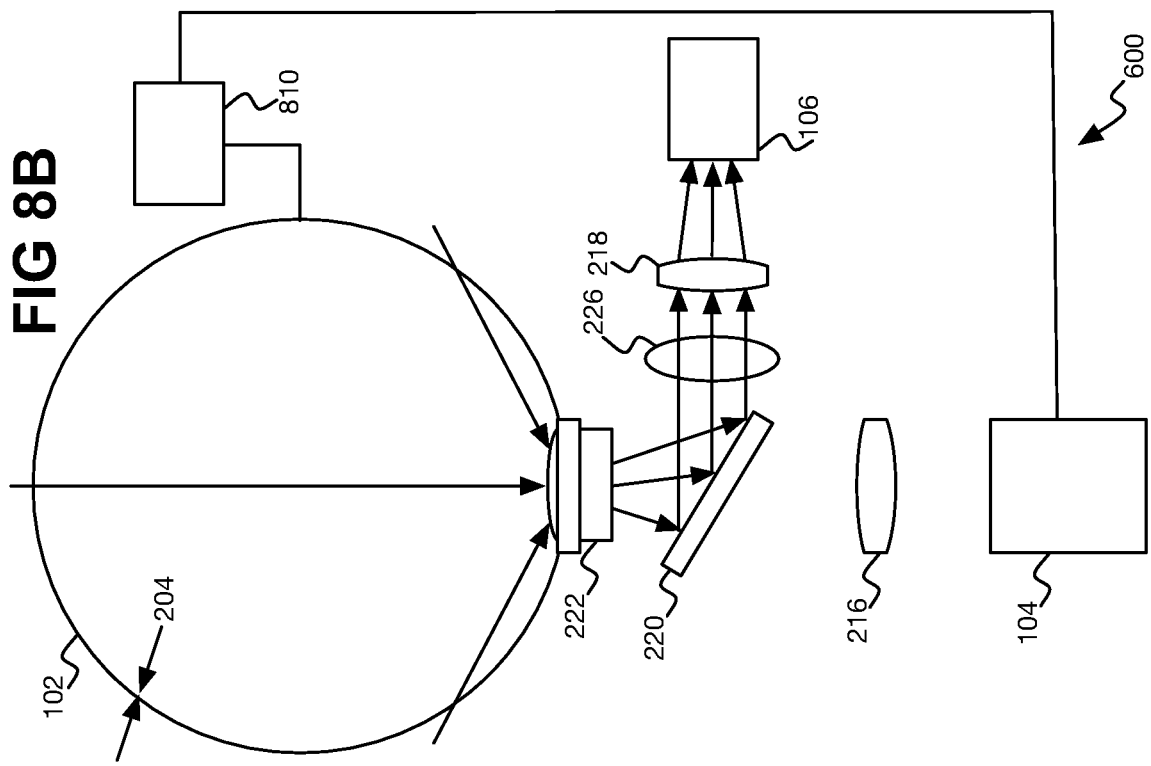
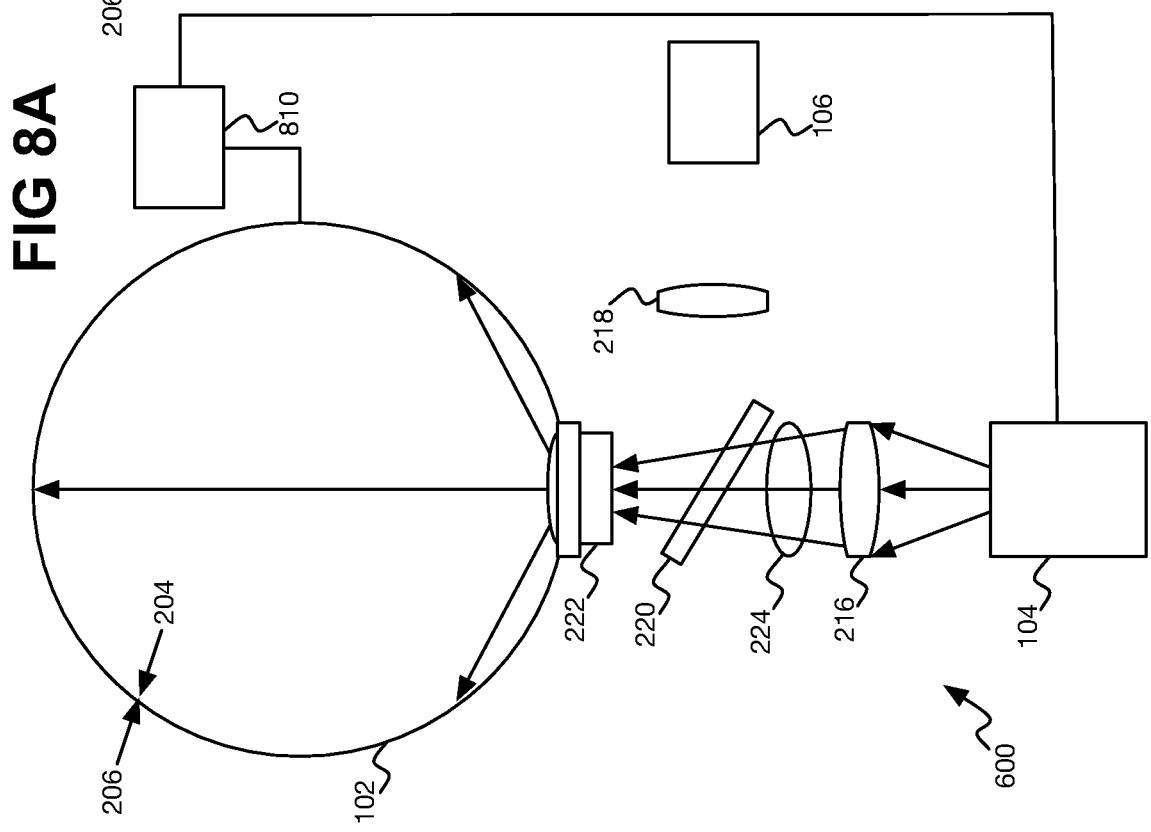

__ IMAGE REAR-PROJECTION AND IMAGE CAPTURE

BACKGROUND

Conventionally, real-time communication between people who are not located at the same place occurred only via audio, such as by using a telephone. Such communication also included teleconferencing, in which more than two people can communicate with one another via audio at the same time. More recently, video calls and videoconferencing have become possible and more popular. In a video call, two people communicate with one another via both audio and video, and in videoconferencing, more than two people can communication with one another in this manner.

BRIEF DESCRIPTION OF THE DRAWINGS

FIGS. 4A and 4B are diagrams of another example implementation of a system for providing image rear-projection and image capture.

FIGS. 6A and 6B are diagrams of a third example implementation of a system for providing image rear-projection and image capture.

FIGS. 8A and 8B are diagrams of a fourth example implementation of a system for providing image rear-projection and image capture.

DETAILED DESCRIPTION

As noted in the back, in video calls and videoconferencing, multiple users who may not be located at the same place can communicate with one another via both audio and video. The video portion of such communication involves having a display and a camera at each location at which one or more users are present. The display permits a local user to see a remote user, whereas the camera can record moving images of the local user to convey to the remote user's display for viewing by the remote user.

The camera may be located above, below, or to either side of the display. For example, in a monitor or a laptop computer, the camera is usually located just above the display panel. The local user generally continually looks at the display, so that he or she can see the remote user of the video communication.

However, this means that the local user is not looking directly at the camera. As such, the remote user does not get a sense that the local user is looking at him or her. This is because the moving images that the local user's camera records and that are displayed on the remote user's display show the user looking downwards, in the case in which the camera is located just above the local user's display.

Techniques described herein ameliorate this shortcoming. A projector is disposed behind the surface and rear-projects an image onto a transparent projection surface, which can be a three dimensionally round surface like a sphere or spheroid, a cylindrical or conical surface, or another type of surface. A camera is also disposed behind the surface, and captures an image of objects in front of the surface. A mechanism minimizes the image that the camera captures from including the rear-projected image as reflected back by the transparent projection surface.

In the context of video communication, a local user looking at the transparent projection surface to view an image of the remote user is also looking at the camera. Therefore, the remote user gets a sense that the local user is looking at him or her, from the captured image of the local user that is displayed to the remote user. More natural video communication is thus achieved.

Figure 1:
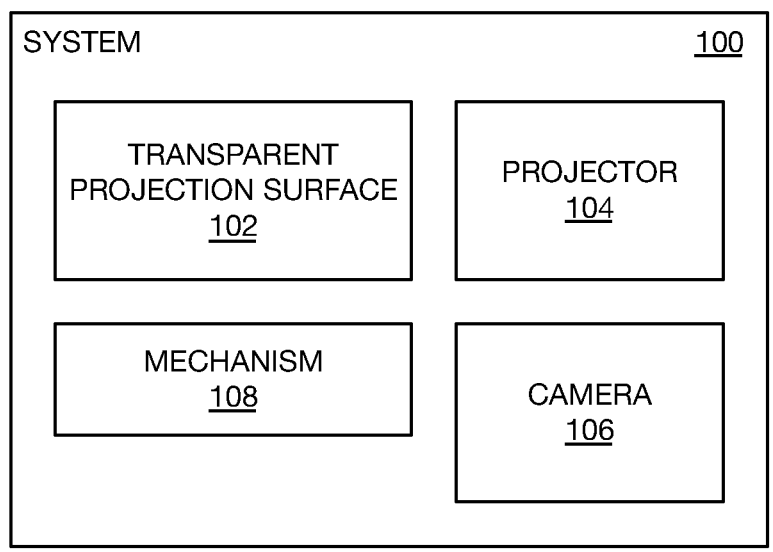
FIG. 1 is a block diagram of an example system for providing image rear-projection and image capture.

FIG. 1 shows such an example system 100. The system 100 includes a transparent projection surface 102, a projector 104, a camera 106, and a mechanism 108. The transparent projection surface 102 may be a two-dimensional surface, such as a flat or curved projection screen. The transparent surface 102 may instead be a three-dimensional surface, such as a sphere or spheroid.

The transparent projection surface 102 is transparent in that it has at least one state in which the surface 102 is transparent. For example, glass or clear plastic can be permanently transparent. By comparison, privacy glass or switchable glass is electrically switchable from transparent to non-transparent.

Transparent as used herein is distinguished from translucent and opaque. The projection surface 102 is transparent in that the surface 102 permits light to pass therethrough. By comparison, a translucent surface permits just some light to pass therethrough, and is not considered a transparent surface herein. An example of a translucent surface is frosted glass, for instance. An object viewed through a translucent surface appears fuzzy or unclear, whereas it does not when viewed through a transparent surface. An opaque surface blocks light from passing therethrough. Examples of opaque surfaces include wood, most metals, and so on.

The projector 104 is disposed behind the transparent projection surface 102, and rear-projects an image, such as a moving image, onto the backside of the projection surface 102, for a user to view from the front side of the surface 102. In this respect, then, the surface 102 is a projection surface. The image that the projector 104 projects is referred to as a first image herein to distinguish this image from other images.

The projector 104 can project a digital image, and as such can be a digital projector. Examples of such digital projectors include liquid-crystal display (LCD) projectors, in which light is projected through LCD panels, as well as digital light processing (DLP) projectors, in which mirrors corresponding to pixels are used to reflect light that then passes through a rotating color wheel. Other types of digital projectors include light-emitting diode (LED) projectors, which employ LEDs as their light source in lieu of filament lamps, and laser projectors, which use lasers as their light source.

The camera 106 is, like the projector 104, disposed behind the transparent projection surface. The camera 106 captures an image, such as a moving image, from in front of the transparent projection surface 102. The captured image is referred to as a second image herein to distinguish this image form other images. The camera 106 thus captures the incoming light passing through the projection surface 102 as the second image. The incoming light originates from the other side of the projection surface 102, and this is why it can be said that the camera 106 captures the second image (from) in front of the surface 102, even though the camera 106 is disposed behind the surface 102.

The camera 106 can capture a digital image, and as such can be a digital camera. A digital camera includes a digital image sensor. A digital image sensor can include a light-sensitive material disposed on a silicon microchip. Light striking the surface of this material is converted into electricity, permitting the capture of a digital image.

The mechanism 108 minimizes the first image as reflected back by the transparent projection surface 102 after rear-projection by the projector 104 from being captured by the camera 106 as part of the second image. That is, although the projection surface 102 is transparent, the surface is likely to reflect back a portion of the outgoing light of the first image towards the camera 106. This reflected light is in addition to incoming light from in front of the projection surface 102, and which passes through the surface 102.

The mechanism 108 thus minimizes, if not eliminates, inclusion of the reflected first image within the captured image. Different implementations of the mechanism 108 are described later in the detailed description. The mechanism 108 can permit the projector 104 to rear-project its first image onto the transparent projection surface 102 at the same time (i.e., simultaneously) that the camera 106 captures the second image from in front of the projection surface 102.

That is, without the mechanism 108, the camera 106 is likely to capture a second image that includes a reflected portion of the first image that the projector 104 projected onto the projection surface 102. In the context of video communication, the net effect would be jarring, because the image that the camera 106 at a local user's location captures and that is displayed at a remote user's display will also include the remote user, since the projector 104 at the local user's location displays an image of the remote user. Without the mechanism 108, in other words, disposing the camera 106 behind the transparent projection surface 102 along with the projector 104 for simultaneous image capture and image projection may be unusable in practice.

Figure 2B:
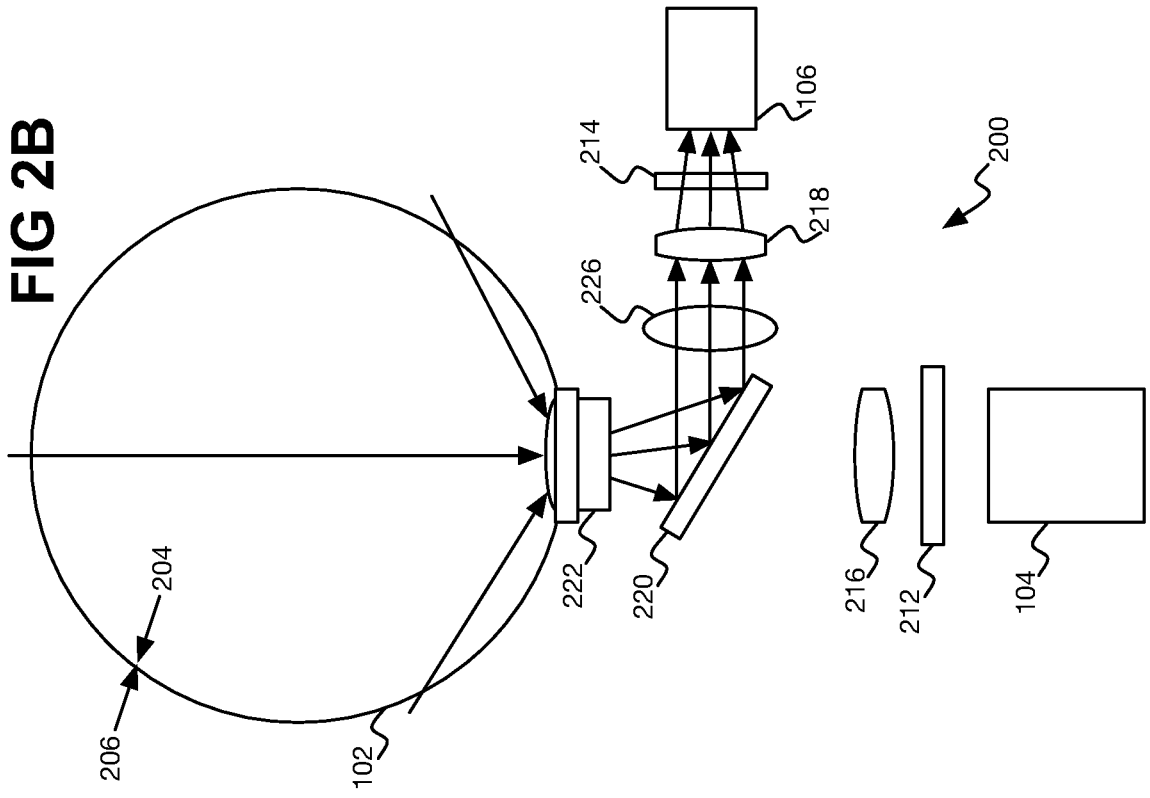
FIGS. 2A and 2B are diagrams of an example implementation of a system for providing image rear-projection and image capture.
Figure 2A:
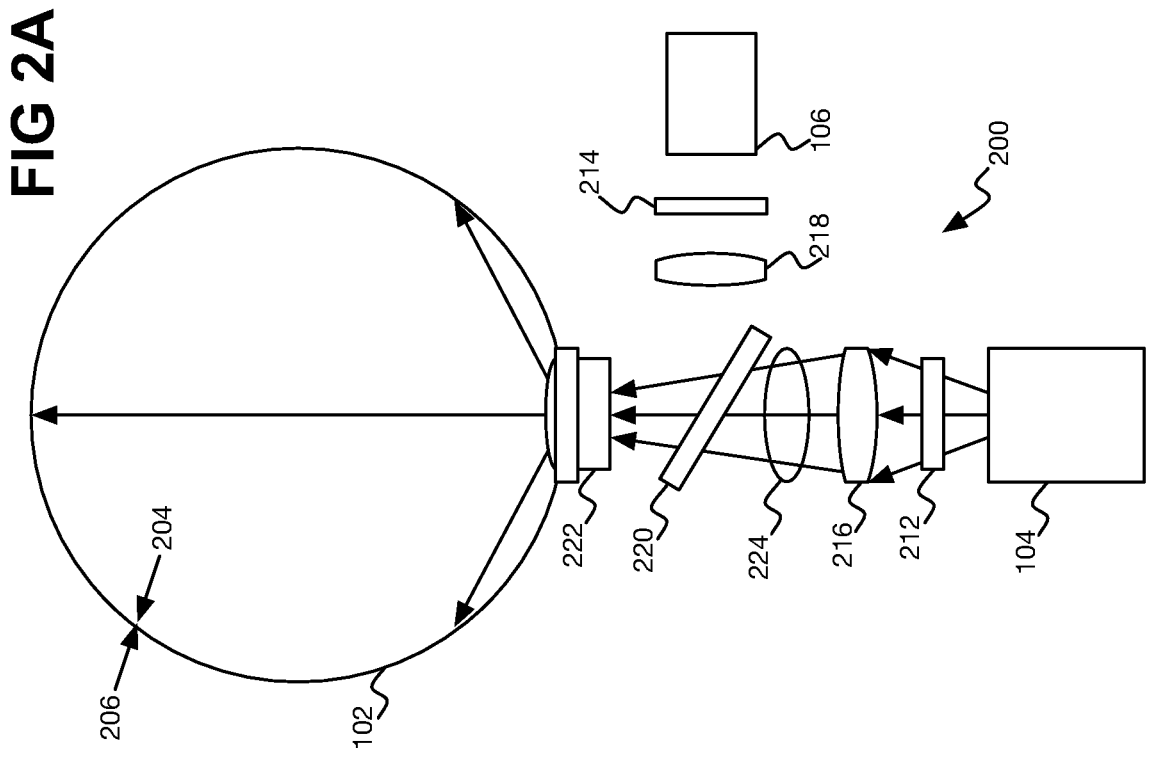

FIGS. 2A and 2B show an example system 200 having a first implementation of the mechanism 108 of FIG. 1. FIG. 2A explicitly shows image rear-projection by the projector 104, which is part of the system 200; FIG. 2B explicitly shows image capture by the camera 106, which is also part of the system 200. Image rear-projection and image capture occur at the same time, but are depicted in different figures for illustrative clarity.

The system 200 includes the transparent projection surface 102. In the example of FIGS. 2A and 2B, the transparent projection surface 102 has a three-dimensional shape, such as a sphere. The projection surface 102 has a back or interior side 204 and a front or exterior side 206.

The system 200 includes a polarization filter 212 in the optical path extending from the projector 104, and a polarization filter 214 in the optical path extending to the camera 106. The polarization filter 214 has a polarization that is ninety degrees relative to the polarization of the polarization filter 212 (and vice-versa). That is, the polarization filter 214 has an opposing or cancelling polarization to the polarization of the polarization filter 214. As such, outgoing light 224 projected by the projector 104 as the first image is polarized at ninety degrees from the incoming light 226 captured by the camera 106 as the second image. The polarization filters 212 and 214 may be a part of the mechanism 108 of FIG. 1.

The system 200 includes a focal lens 216 in the optical path extending from the projector 104, and a focal lens 218 in the optical path extending to the camera 106. The focal lens 216 focuses the outgoing light projected by the projector 104. Similarly, the focal lens 218 focuses the incoming light captured by the camera 106.

The system 200 includes a beam splitter 220 in both the optical path extending from the projector 104 and the optical path extending to the camera 106. The beam splitter 220 permits the outgoing light 224 from the projector 104 to pass through the splitter 220, while reflecting the incoming light 226 towards the camera 106. The beam splitter 220 thus reflects the incoming light 226 at an angle, such as at ninety degrees, so that the incoming light 226 reaches the camera 106. The beam splitter 220 may also be a part of the mechanism 108 of FIG. 1. Furthermore, in one implementation, the beam splitter 220 can be a polarizing beam splitter that effectively encompasses the polarizing filters 212 and 214. As such light of one polarization passes through the splitter 220 (i.e., performing the functionality of the filter 212) and light of another polarization is redirected (i.e., performing the functionality of the filter 214).

The system 200 includes a panamorphic (i.e., 360-degree) lens 222 at a base of the spherical transparent projection surface 102. The panamorphic lens 222 is situated in both the optical path extending from the projector 104 and the optical path extending to the camera 106. The outgoing light 224 projected from the projector 104 passes outwards through the lens 222 towards the transparent projection surface 102, whereas the incoming light 226 passes inward through the lens 222 for capture by the camera 106.

Therefore, in FIG. 2A, the projector 104 projects a first image as the outgoing light 224. The outgoing light 224 is projected along an optical path through the polarization filter 212, the focal lens 216, the beam splitter 220, and the panamorphic lens 222, and onto the back side 204 of the transparent projection surface 102. That is, the projector 104 projects the outgoing light 224 of the first image onto the projection surface 102. The projection is rear-projection, because the first image is viewable from the front side 206 of the projection surface 102.

In FIG. 2B, the camera 106 captures a second image as the incoming light 226. The incoming light 226 travels along an optical path from outside the transparent projection surface 102 (i.e., through the front side 206 of the surface 102 and then through the back side 204) and through the panamorphic lens 222 before the beam splitter 220 reflects the incoming light 226. The incoming light 226 then continues along an optical path through the focal lens 218 and the polarization filter 214 before being captured by the camera 106 as the second image.

The transparent projection surface 102 may reflect back a portion of the outgoing light 224, which then becomes part of the incoming light 226. However, the digital camera 106 does not capture this reflected portion of the outgoing light 224 within the incoming light 226 as the second image. This is because the reflected outgoing light 224 has a polarization that is ninety degrees relative to that of the incoming light 226 once the incoming light 226 passes through the polarization filter 214. Therefore, the polarization filters 212 and 214 act to minimize, if not eliminate, the first image rear-projected by the projector 104, as reflected back by the transparent projection surface 102, from being captured by the camera 106 as part of the second image.

Figure 3A:
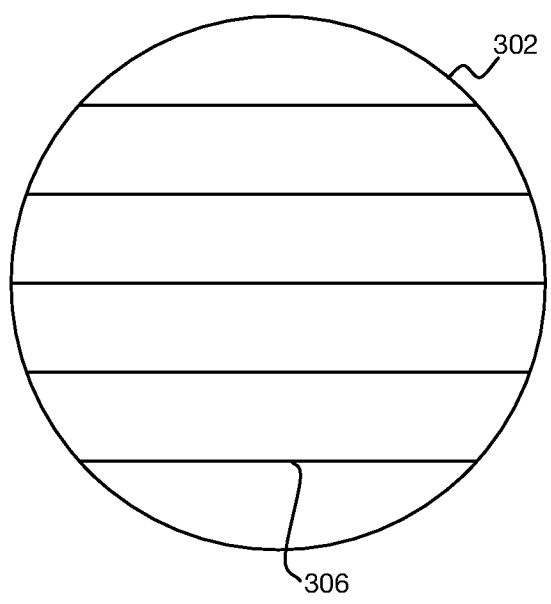
FIGS. 3A and 3B are diagrams of example opposing polarization filters.
Figure 3B:
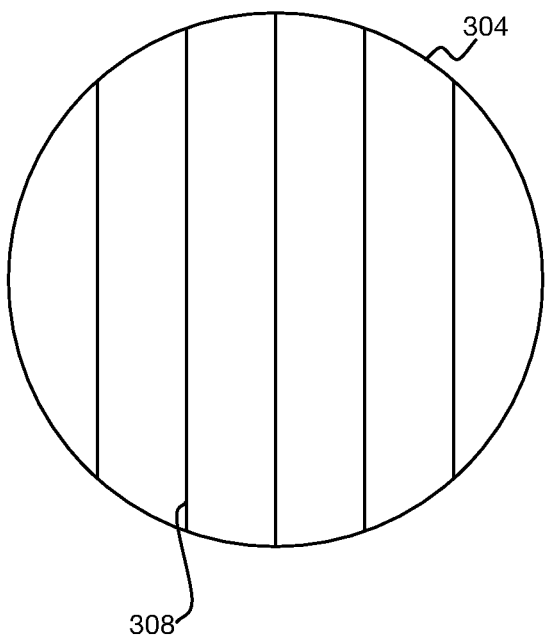

FIGS. 3A and 3B show example polarization filters 302 and 304 that are polarized at ninety degrees relative to one another. The polarization filter 302 may serve as the polarization filter 212 and the polarization filter 304 may serve as the polarization filter 214, or vice-versa. The polarization filter 302 has a horizontal polarization 306, whereas the polarization filter 304 has a vertical polarization 308. Therefore, the polarization filter 302 permits that portion of the light that is horizontally aligned to pass through, whereas the polarization filter 304 permits the portion of the light that is vertically aligned to pass through.

For example, the outgoing light 224 projected by the projector 104 in FIG. 2A can include just horizontally aligned light after passing through the filter 212 if the filter 212 is the filter 302 of FIG. 3A, and the incoming light 226 captured by the camera 106 in FIG. 2B includes just vertically aligned light after passing through the filter 214 if the filter 214 is the filter 304 of FIG. 3B. Therefore, to the extent that any outgoing light 224 is reflected back by the transparent projection surface 102, such reflected light will not pass through the filter 214 and thus not reach the camera 106. This is because the reflected light will have the opposing polarity of the polarization filter 214, and will not pass through the filter 214.

FIGS. 4A and 4B show an example system 400 having a second implementation of the mechanism 108 of FIG. 1. Whereas the mechanism 108 of FIG. 1 includes the polarization filters 212 and 214 in the implementation of FIGS. 2A and 2B, in FIGS. 4A and 4B the mechanism 108 can include a color wheel 402 and a motor 404. Otherwise, the system 400 operates similarly to the system 200 that has been described, and to avoid descriptive duplication, primarily just the portion of the system 400 that differs from the system 200 is described in detail in relation to FIGS. 4A and 4B.

FIG. 4A, like FIG. 2A, explicitly shows image rear-projection by the projector 104, which is part of the system 400. FIG. 4B, like FIG. 2B, explicitly shows image capture by the camera 106, which is also part of the system 400. As in the system 200, image rear-projection and image capture occur at the same time, but are depicted in different figures for illustrative clarity.

The color wheel 402 is rotatable, and the motor 404 rotates the color wheel 402. The color wheel 402 can have the shape of a truncated cone. The portion of the color wheel 402 that is currently in the optical path between the projector 104 and the focal lens 216 is identified as the color wheel portion 412 in FIG. 4A. The portion of the color wheel 402 that is currently in the optical path between the focal lens 218 and the camera 106 is identified as the color wheel portion 414 in FIG. 4B. Because the color wheel 402 is constantly rotating, the portions of the color wheel 402 that are the color wheel portions 412 and 414 continually change.

The colors of the color wheel 402 are such that the color of the color wheel portion 414 is continually complementary to the color of the color wheel portion 412. Complementary colors are colors that are directly opposite one another in the color spectrum. The outgoing light 224 projected by the projector 104 passes through the color path portion 412, which has a complementary color to the color of the color path portion 414 through which the incoming light 226 passes before being captured by the camera 106. Stated another way, the outgoing light 224 projected by the projector 104 as the first image has a color that is continually complementary to the color of the incoming light 226 captured by the camera 106 as the second image.

As in FIG. 2, the transparent projection surface 102 may reflect back a portion of the outgoing light 224, which then becomes part of the incoming light 226. However, the digital camera 106 does not capture this reflected portion of the outgoing light 224 within the incoming light 226 as the second image. This is because the reflected outgoing light 224 had earlier passed through the color wheel portion 412 after being projected by the projector 104, and the color wheel portion 412 continually has a color that is complementary to the color of the color wheel portion 414 through which the incoming light 226 passes before capture by the camera 106.

Because the color of the color wheel portion 414 is complementary to the color of the color wheel portion 412, the color wheel portion 414 filters out that part of the incoming light 226 that has the color of the color wheel portion 412. The reflected outgoing light 224 will have the color of the color wheel portion 412, and therefore the color wheel portion 414 will filter out the reflected outgoing light 224 from the incoming light 226. Therefore, the color wheel 402, particularly the complementary colors of the color wheel portions 412 and 414, act to minimize, if not eliminate, the first image rear-projected by the projector 104, as reflected back by the transparent projection surface 102, from being captured by the camera 106 as part of the second image.

Figure 5:
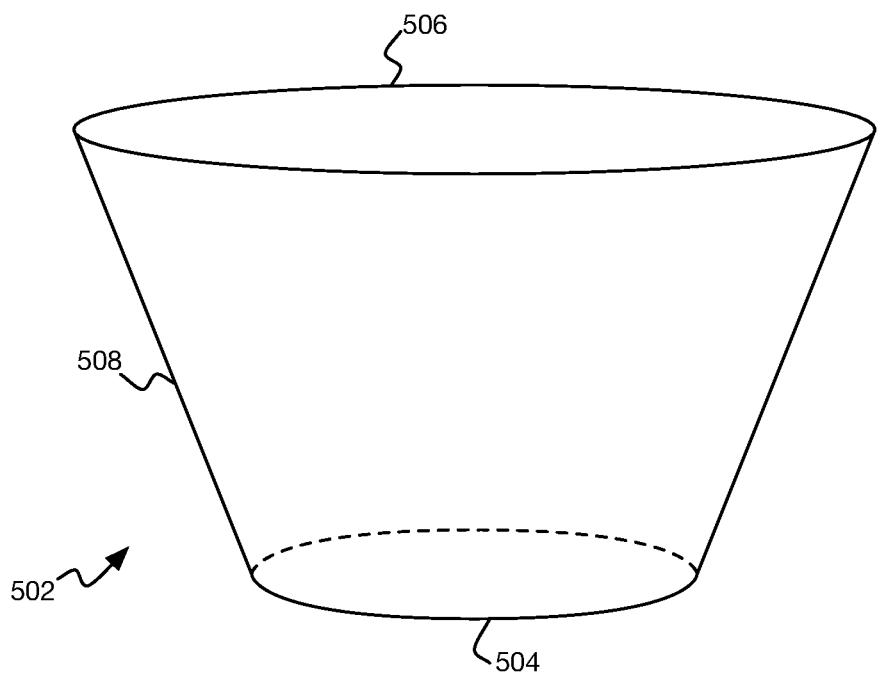
FIG. 5 is a diagram of an example color wheel.

FIG. 5 shows an example color wheel 502 that can serve as the color wheel 402 of FIGS. 4A and 4B. The color wheel 502 has a bottom surface 504 to which the shaft of the motor 404 of FIGS. 4A and 4B can be attached. The color wheel 502 can have an open top 506. The color wheel 502 has a side surface 508 that has a light-transmissive color gradient of the visible color spectrum. The color wheel portions 412 are specifically portions of the side surface 508. However, which portions of the side surface 508 the color wheel portions 412 are continually changes, as the color wheel 502 rotates.

FIGS. 6A and 6B show an example system 600 having a third implementation of the mechanism 108 of FIG. 1. Whereas the mechanism 108 of FIG. 1 includes the polarization filters 212 and 214 in the implementation of FIGS. 2A and 2B, and includes the color wheel 402 and the motor 404 in FIGS. 4A and 4B, in FIGS. 6A and 6B the mechanism 108 can include a shutter 602 and a motor 604. The shutter 602 has a light-absorbing or light-blocking side 602 and a light-reflecting or light-directing side 608. The implementation of FIGS. 6A and 6B further does not have to include the beam splitter 220, and the splitter 220 is not depicted in these figures. Otherwise, the system 600 operates similarly to the systems 200 and 400 that have been described, and to avoid descriptive duplication, primarily just the portion of the system 600 that differs from the systems 200 and 400 is described in relation to FIGS. 6A and 6B.

FIG. 6A, like FIGS. 2A and 4A, explicitly shows image rear-projection by the projector 104, which is part of the system 600. FIG. 6B, like FIGS. 2B and 4B, explicitly shows image capture by the camera 106, which is also part of the system 600. The image rear-projection of FIG. 6A and the image capture of FIG. 6B occur in successive frames (i.e., periods of time). For example, if there are N frames per second, image rear-projection occurs in N/2 frames (such as just the odd frames, or just the even frames), and image capture occurs in the other N/2 frames (such as just the even frames, or just the odd frames).

The motor 604 rotates the shutter 602 between a position in which image rear-projection occurs in FIG. 6A and a position in which image capture occurs in FIG. 6B. In FIG. 6A, for instance, the projector 104 projects a first image onto the transparent projection surface 102. In the position in FIG. 6A, the shutter does not block the optical path of the outgoing light 224 of the first image. The camera 106 does not capture a second image in FIG. 6A, because in the position in FIG. 6A, the shutter does not reflect or direct any incoming light to the camera 106. That is, there is no optical path between the transparent projection surface 102 and the camera 106 in FIG. 6A.

In FIG. 6B, by comparison, the shutter 602 blocks the optical path of the outgoing light 224 of the first image rear-projected by the projector 104. Therefore, the light-absorbing side 606 prevents the outgoing light 224 from reaching the transparent projection surface 102. However, in FIG. 6B the shutter 602 effectively creates the optical path of the incoming light 226 from the transparent projection surface 102 to the camera 106, which then captures the incoming light 226 as the second image. The light-reflecting side 608 reflects the incoming light 226 towards the camera 106.

The transparent projection surface 102 may reflect back a portion of the outgoing light 224 when the projector 104 is projecting the first image in FIG. 6A. However, when the outgoing light 224 reaches the projection surface 102, the camera 106 is not capturing the second image, and as such it does not matter that the projection surface reflects back a portion of the outgoing light 224. By comparison, when the camera 106 is capturing the incoming light 226 as the second image, the outgoing light 224 of the second image is not reaching the projection surface 102, because the shutter 602 is blocking or absorbing the outgoing light. As such, when the camera 106 is capturing the incoming light 226, there is no outgoing light 224 that the transparent projection surface 102 could potentially reflect back as part of the incoming light 226.

In the example implementation of FIGS. 6A and 6B, the transparent projection surface 102 may be privacy or switchable glass or another material. This means that the surface 102 can be electrically switched from a transparent state to a non-transparent state. The mechanism 108 in the implementation of FIGS. 6A and 6B can include a controller 610, which switches the surface 102 so that the surface is non-transparent, such as translucent, while rear-image projection occurs in FIG. 6A, and is transparent while image capture occurs in FIG. 6B. The controller 610 may be implemented at least in hardware, and can be an application-specific integrated circuit (ASIC) or another type of IC.

Figure 7:
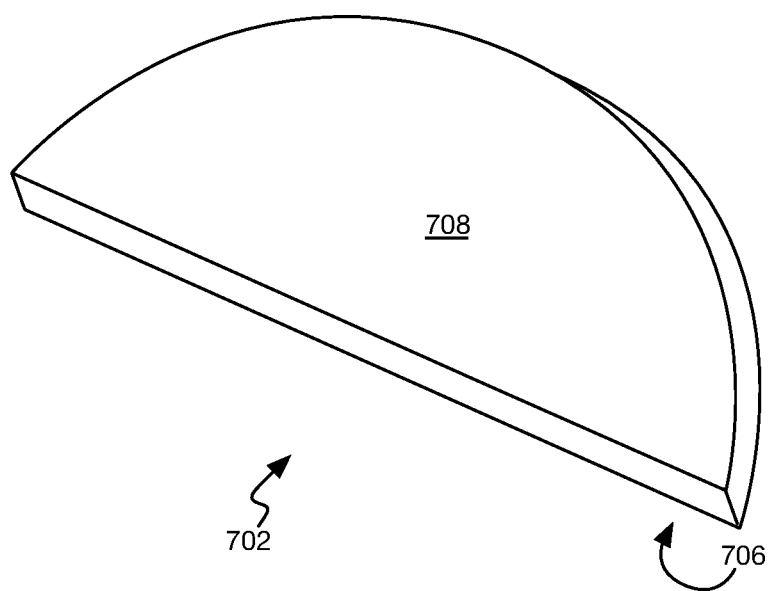
FIG. 7 is a diagram of an example shutter.

FIG. 7 shows an example shutter 702 that can serve as the shutter 602 of FIGS. 6A and 6B. The shutter 702 can be half-circular in shape. The shutter 702 has opposing sides 706 and 708. The side 706 corresponds to the side 606 in FIGS. 6A and 6B, and the side 708 corresponds to the side 608 in FIGS. 6A and 6B. The side 706 is a light-absorbing or light-blocking side, and the side 708 is a light-reflecting or light-directing side.

In the implementation of FIGS. 6A and 6B that has been described, the shutter 602 serves to define the times or frames when the projector 104 projects a first image onto the transparent projection surface 102 and when the camera 106 captures a second image from in front of the projection surface 102. If the shutter 602 rotates at N frames per second, then this means that the projector 104 will project the first image onto the projection surface 102 at N/2 frames per second, and the camera 106 will likewise capture the second image from in front of the surface 102 at N/2 frames per second. The shutter 602 is thus a mechanical manner by which to control when the projector 104 projects the first image onto the projection surface 102 and when the camera 106 captures the second image from in front of the surface 102.

FIGS. 8A and 8B, by comparison, show an example system 800 having a fourth implementation of the mechanism 108 of FIG. 1, which provides for an electronic manner by which to control when the projector projects a first image onto the transparent projection surface 102 and when the camera 106 captures a second image from in front of the projection surface 102. Whereas in the implementation of FIGS. 6A and 6B the mechanism 108 of FIG. 1 includes the shutter 602 and the motor 604, in FIGS. 8A and 8B the mechanism does not have to, and can include just a controller 810. Unlike the implementation of FIGS. 6A and 6B, the implementation of FIGS. 8A and 8B includes the beam splitter 220. The system 800 operates similarly to the systems 200, 400, and 600 that have been described, and to avoid descriptive duplication, primarily just the portion of the system 800 that differs particularly from the system 600 is described in relation to FIGS. 8A and 8B.

FIG. 8A, like FIG. 6A, explicitly shows image rear-projection by the projector 104, which is part of the system 800. FIG. 8B, like FIG. 6B, explicitly shows image capture by the camera 106, which is also part of the system 800. As in FIGS. 6A and 6B, the image rear-projection of FIG. 8A and the image capture of FIG. 8B occur in successive frames. For example, if there are N frames per second, image rear-projection occurs in N/2 frames (such as just the odd frames, or just the even frames), and image capture occurs in the other N/2 frames (such as just the even frames, or just the odd frames).

Rather than mechanically using a shutter 602 rotated by a motor 604 as in FIGS. 6A and 6B, however, the implementation of FIGS. 8A and 8B instead employs the controller 810. The controller 810, which may be implemented at least in hardware, and can be an ASIC or another type of IC, is communicatively connected to both the projector 104 and the camera 106. In FIG. 6A, the controller 810 controls the projector 104 to project the outgoing light 224 of the first image, and controls the camera 106 to not capture any incoming light such that no second image is captured. By comparison, in FIG. 6B, the controller 810 controls the camera 106 to capture the incoming light 226 as the second image, and controls the projector 104 to not project any outgoing light such that no first image is projected.

Therefore, the implementation of FIGS. 6A and 6B mechanically prevents the camera 106 from capturing the second image when the projector 104 is projecting the first image onto the transparent projection surface 102, and mechanically prevents the projector 104 from projecting the first image onto the surface 102 when the camera 102 is capturing the second image. By comparison, the implementation of FIGS. 8A and 8B achieves such prevention electronically. Specifically, the controller 810 controls when the projector 104 projects the first image and when the camera 106 captures the second image, over successive frames.

The transparent projection surface 102 may reflect back a portion of the outgoing light 224 when the projector 104 is projecting the first image in FIG. 8A. However, when the outgoing light 224 reaches the projection surface 102, the camera 106 is not capturing the second image, and as such it does not matter that the projection surface reflects back a portion of the outgoing light 224. By comparison, when the camera 106 is capturing the incoming light 226 as the second image in FIG. 8B, the projector 104 is not projecting the first image. As such, when the camera 106 is capturing the incoming light 226, there is no outgoing light 224 that the transparent projection surface 102 could potentially reflect back as part of the incoming light 226.

As in FIGS. 6A and 6B, in the example implementation of FIGS. 8A and 8B, the transparent projection surface 102 may be privacy or switchable glass or another material. The controller 810 can thus control the projection surface 102 while controlling the projector 104 and the camera 106. Therefore, when the controller 810 is in FIG. 8A causing the projector 104 to project the first image and is causing the camera 106 not to capture the second image, the controller 810 can also switch the surface 102 so that it is non-transparent, such as translucent. When the controller 810 is in FIG. 8B causing the projector 104 not to project the first image and is causing the camera 106 to capture the second image, the controller 810 can also switch the surface 102 so that it is transparent.

Figure 9:
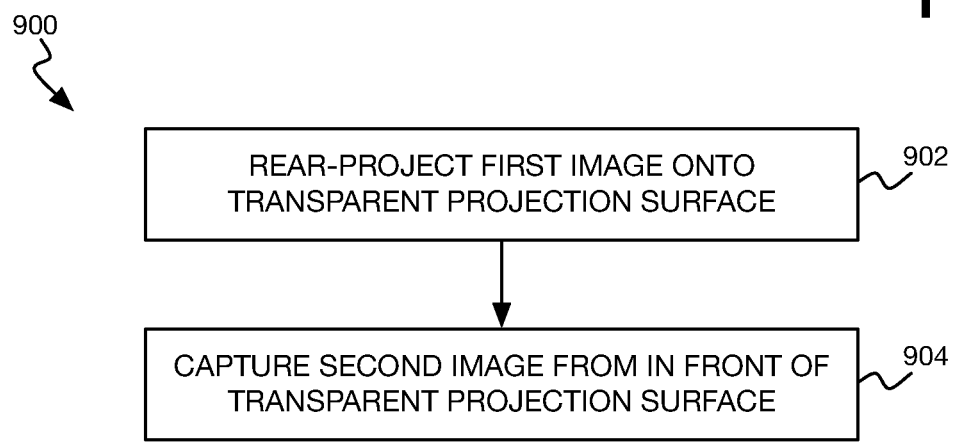
FIG. 9 is a flowchart of an example method.

FIG. 9 shows an example method 900. The method 900 includes the projector 104 disposed behind the transparent projection surface 102 projecting a first image onto the projection surface 102 (902). The method 900 also includes the camera 106 disposed behind the transparent projection surface 102 capturing the second image in front of the projection surface 102 (904), without capturing the first image as reflected back by the surface 102.

In the example implementation of FIGS. 2A and 2B that has been described, part 902 can thus include polarizing outgoing light 224 of the first image with a first polarization. Part 904 can then include polarizing incoming light 226 with a second polarization that is ninety degrees relative to the first polarization. The camera 106 thus captures the incoming light as polarized with the second polarization, as the second image.

In the example implementation of FIGS. 4A and 4B that has been described, part 902 can include the outgoing light 224 of the first image passing through a rotating color wheel 402. Part 904 can similarly include the incoming light 226 passing through the rotating color wheel 402, with the camera 106 capturing the incoming light 226 after having passed through the color wheel 402 as the second image. At every instant in time, the color of the color wheel 402 through which the outgoing light 224 passes and the color of the color wheel 402 through which the incoming light 226 passes are complementary to one another.

In the example implementation of FIGS. 6A and 6B that has been described, part 902 can include, during a first period of time, permitting the outgoing light 224 of the first image to pass, and blocking the incoming light 226 from reaching the camera 106. Part 904 can include, during a second period of time adjacent to the first period of time, preventing the outgoing light 224 of the first image from reaching the transparent projection surface 102, and permitting the incoming light 226 to reach the camera 106. The camera 106 captures the incoming light 226 as the second image.

In the example implementation of FIGS. 8A and 8B that has been described, part 902 can include, during a first period of time, causing the projector to rear-project the first image towards the transparent projection surface 102, and causing the camera 106 to not capture a second image. Part 904 can include, during a second, adjacent period of time, causing the projector to not rear-project the first image, and causing the camera 106 to capture the second image. In both the implementation of FIGS. 6A and 6B and the implementation of FIGS. 8A and 8B, parts 902 and 904 can then be repeated over new first and second periods of time.

The techniques described herein permit a camera to be disposed behind the transparent projection surface onto which a projector rear-projects an image. Image capture of the rear-projected image as reflected back by the projection surface is minimized. A user viewing the projection surface from the front of the surface thus can have his or her image captured while looking directly at the camera.

I claim:

1. A system comprising:
 a transparent projection surface that is three dimensionally round;
 a projector disposed behind the transparent projection surface to rear-project a first image onto the transparent projection surface;
 a camera disposed behind the transparent projection surface to capture a second image in front of the transparent projection surface; and
 a mechanism to minimize the first image as reflected back by the transparent projection surface after rear-projection by the projector from being captured by the camera as part of the second image.

2. The system of claim 1, wherein the mechanism comprises:
 a beam splitter to direct outgoing light of the first image rear-projected by the projector towards the transparent projection surface, and to direct incoming light towards the camera that the camera is to capture as the second image.

3. The system of claim 2, wherein the mechanism further comprises:
 a first polarization filter positioned between the projector and the beam splitter to polarize the outgoing light of the first image with a first polarization;
 a second polarization filter positioned between the camera and the beam splitter to polarize the incoming light with a second polarization that is ninety degrees relative to the first polarization, the camera capturing the incoming light as polarized with the second polarization as the second image.

4. The system of claim 2, wherein the mechanism further comprises:
 a color wheel positioned between the projector and the beam splitter and positioned between the camera and the beam splitter, the outgoing light of the first image and the incoming light passing through the first color wheel as the first color wheel rotates, the camera capturing the incoming light as having passed through the second color wheel as the second image; and
 a motor to rotate the color wheel in unison,
 wherein the color wheel is configured so as the color wheel rotates, the incoming light continually passes through a complementary color to a color through which the outgoing light passes.

5. The system of claim 1, wherein the mechanism comprises:
 a motor; and
 a shutter rotated by the motor and disposed relative to the projector and the camera so that for adjacent first and second periods of time:
  during the first period of time, the shutter permits outgoing light of the first image rear-projected by the projector towards the transparent projection surface to pass, and prevents incoming light from reaching the camera; and
  during the second period of time, the shutter prevents the outgoing light from reaching the transparent projection surface, and permits the incoming light to reach the camera that the camera is to capture as the second image.

6. The system of claim 5, wherein a first optical path between the projector and the transparent projection surface is straight, and a second optical path between the transparent projection surface and the mechanism has is non-straight, wherein the shutter has a first surface and a second surface opposite the first surface, the first surface farther from the transparent projection surface than the second surface, and wherein the first surface is absorbing and the second surface is reflective.

7. The system of claim 5, wherein the transparent projection surface is a switchably transparent projection surface, the system further comprising:
a controller to switch the transparent projection surface to a non-transparent state during the first period of time, and to switch the transparent projection surface to a transparent state during the second period of time.

8. The system of claim 1, wherein the mechanism comprises:
a controller to, for adjacent first and second periods of time:
during the first period of time, cause the projector to rear-project the first image towards the transparent projection surface and to cause the camera to not capture the second image; and
during the second period of time, cause the projector to not rear-project the first image towards the projection transparent projection surface and to cause the camera to capture the second image.

9. The system of claim 8, wherein the transparent projection surface is a switchably transparent projection surface,
and wherein the controller is to switch the transparent projection surface to a non-transparent state during the first period of time, and is to switch the transparent projection surface to a transparent state during the second period of time.

10. A system comprising:
a transparent projection surface;
a projector disposed behind the transparent projection surface to rear-project a first image onto the transparent projection surface;
a camera disposed behind the transparent projection surface to capture a second image in front of the transparent projection surface; and
a mechanism to minimize the first image as reflected back by the transparent projection surface after rear-projection by the projector from being captured by the camera as part of the second image,
wherein the mechanism comprises:
a beam splitter to direct outgoing light of the first image rear-projected by the projector towards the transparent projection surface, and to direct incoming light towards the camera that the camera is to capture as the second image;
a color wheel positioned between the projector and the beam splitter and positioned between the camera and the beam splitter, the outgoing light of the first image and the incoming light passing through the first color wheel as the first color wheel rotates, the camera capturing the incoming light as having passed through the second color wheel as the second image; and
a motor to rotate the color wheel in unison,
and wherein the color wheel is configured so as the color wheel rotates, the incoming light continually passes through a complementary color to a color through which the outgoing light passes.

11. A system comprising:
a transparent projection surface;
a projector disposed behind the transparent projection surface to rear-project a first image onto the transparent projection surface;
a camera disposed behind the transparent projection surface to capture a second image in front of the transparent projection surface; and
either a first mechanism or a second mechanism to minimize the first image as reflected back by the transparent projection surface after rear-projection by the projector from being captured by the camera as part of the second image,
wherein the first mechanism comprises:
a motor; and
a shutter rotated by the motor and disposed relative to the projector and the camera so that for adjacent first and second periods of time:
during the first period of time, the shutter permits outgoing light of the first image rear-projected by the projector towards the transparent projection surface to pass, and prevents incoming light from reaching the camera; and
during the second period of time, the shutter prevents the outgoing light from reaching the transparent projection surface, and permits the incoming light to reach the camera that the camera is to capture as the second image,
and wherein the second mechanism comprises:
a controller to, for adjacent first and second periods of time:
during the first period of time, cause the projector to rear-project the first image towards the transparent projection surface and to cause the camera to not capture the second image; and
during the second period of time, cause the projector to not rear-project the first image towards the projection transparent projection surface and to cause the camera to capture the second image.

12. The system of claim 11, comprising the first mechanism and not the second mechanism,
wherein a first optical path between the projector and the transparent projection surface is straight, and a second optical path between the transparent projection surface and the mechanism has is non-straight,
wherein the shutter has a first surface and a second surface opposite the first surface, the first surface farther from the transparent projection surface than the second surface,
and wherein the first surface is absorbing and the second surface is reflective.

13. The system of claim 11, comprising the first mechanism and not the second mechanism,
wherein the transparent projection surface is a switchably transparent projection surface, the system further comprising:
a controller to switch the transparent projection surface to a non-transparent state during the first period of time, and to switch the transparent projection surface to a transparent state during the second period of time.

14. The system of claim 11, comprising the second mechanism and not the first mechanism,
wherein the transparent projection surface is a switchably transparent projection surface,
and wherein the controller is to switch the transparent projection surface to a non-transparent state during the first period of time, and is to switch the transparent projection surface to a transparent state during the second period of time.

* * * * *